(12) United States Patent
Ueno et al.

(10) Patent No.: US 6,984,712 B2
(45) Date of Patent: Jan. 10, 2006

(54) LIQUID-CRYSTAL POLYESTER RESIN

(75) Inventors: Ryuzo Ueno, Nishinomiya (JP); Masaya Kitayama, Takarazuka (JP); Kiichi Kometani, Ikeda (JP); Hiroyuki Kato, Kawanishi (JP); Kazunori Ueda, Takarazuka (JP)

(73) Assignee: Kabushiki Kaisha Ueno Seiyaku Oyo Kenkyujo, Osaka (JP)

( * ) Notice: Subject to any disclaimer, the term of this patent is extended or adjusted under 35 U.S.C. 154(b) by 177 days.

(21) Appl. No.: 10/496,490

(22) PCT Filed: Nov. 25, 2002

(86) PCT No.: PCT/JP02/12257

§ 371 (c)(1),
(2), (4) Date: Oct. 7, 2004

(87) PCT Pub. No.: WO03/046043

PCT Pub. Date: Jun. 5, 2003

(65) Prior Publication Data

US 2005/0054811 A1 Mar. 10, 2005

(30) Foreign Application Priority Data

Nov. 26, 2001 (JP) .................................. 2001-359350

(51) Int. Cl.
*C08G 63/06* (2006.01)
*C08F 20/00* (2006.01)
*C09K 19/32* (2006.01)

(52) U.S. Cl. ............... 528/206; 528/176; 528/180; 528/190; 528/191; 528/193; 528/207; 528/212; 528/218; 525/437; 525/444; 252/299.62

(58) Field of Classification Search ............... 528/176, 528/180, 190, 191, 193, 206, 207, 212, 218; 525/437, 444; 252/299.62
See application file for complete search history.

(56) References Cited

U.S. PATENT DOCUMENTS 5,808,142 A * 9/1998 Rittner et al. ............... 562/406
6,656,386 B2 * 12/2003 Suenaga et al. ........ 252/299.62

FOREIGN PATENT DOCUMENTS

| EP | 0 702 702 B1 | 5/1999 |
| EP | 1103573 A1 | 5/2001 |
| EP | 1 103 573 A1 | 5/2001 |
| EP | 1 422 256 A1 | 5/2004 |
| WO | WO 94/29366 A1 | 12/1994 |

* cited by examiner

Primary Examiner—Samuel A. Acquah
(74) Attorney, Agent, or Firm—Sughrue Mion, PLLC

(57) ABSTRACT

The present invention provides a liquid-crystalline polyester resin which comprises monomer units derived from 2-hydroxy-3-naphthoic acid and/or 2-hydroxynaphthalene-3,6-dicarboxylic acid in an amount of 1–5000 mmol % based on the total monomer components of the resin and an alkaline metal compound in an amount of 10–3000 ppm as alkaline metal based on the total monomer components of the resin. The liquid-crystalline polyester resin of the present invention has good colorability, improved heat resistance and good mechanical properties.

5 Claims, No Drawings

LIQUID-CRYSTAL POLYESTER RESIN

TECHNICAL FIELD

The present invention relates to a liquid-crystalline polyester resin. More particularly, it relates to a liquid-crystalline polyester resin which has good colorability, improved heat resistance and good mechanical properties.

BACKGROUND ART

Thermotropic liquid-crystalline polyester resin (which is called liquid-crystalline polyester resin or LCP hereinafter) is used not only for molded articles but also for a variety of products such as fibers and films because of its good properties including heat resistance, mechanical properties such as rigidity, chemical resistance and dimensional accuracy. Particularly, parts used in personal computers and mobile phones are highly integrated and the art wishes to use downsized, thinner and smaller parts. In the information and telecommunication fields, very thin parts, as thin as 0.5 mm or less of the thickness, are sometimes required. Based on the excellent molding properties of the LCPs including good flowability and less flash development compared to the other thermoplastic resins, consumption of the LCPs has been increasing.

On the other hand, there still exists a need for improving flowability, heat resistance and mechanical properties of liquid-crystalline polyester resins and there have been many proposals about the improvement of LCP. For example Japanese Patent Application Laid Open No. 511573/1996 discloses a liquid-crystalline polyester resin composition with improved heat resistance made by admixing an alkaline metal within certain kinds of monomers and polymerizing them.

However there is still a room for improvement with respect to uniform colorability and restoring the color of colorant such as carbon black, azo pigment and the like. Accordingly, in the field that requires uniform colorability and bright coloration, the use of LCP has been limited.

An object of the present invention is to provide a liquid-crystalline polyester resin with good colorability, an improved heat resistance and satisfactory mechanical properties.

SUMMARY OF INVENTION

The present inventors have found that a liquid-crystalline polyester resin with good colorability, improved heat resistance and good mechanical properties can be obtained by copolymerizing a small amount of 2-hydroxy-3-naphthoic acid and/or 2-hydroxynaphthalene-3,6-dicarboxylic acid with other polymerizing monomers and admixing a certain amount of an alkaline metal compound with the copolymer and have completed the invention.

Accordingly, the present invention provides a liquid-crystalline polyester resin with good colorability, improved heat resistance and good mechanical properties, which comprises monomer units derived from 2-hydroxy-3-naphthoic acid and/or 2-hydroxynaphthalene-3,6-dicarboxylic acid in an amount of 1–5000 mmol % based on the total monomer components of the resin and an alkaline metal compound in an amount of 10–3000 ppm as alkaline metal based on the total monomer components of the resin.

BEST MODE FOR CARRYING OUT THE INVENTION

The liquid-crystalline polyester resin of the present invention comprises, as its structural components, monomer units derived from 2-hydroxy-3-naphthoic acid and/or 2-hydroxynaphthalene-3,6-dicarboxylic acid in an amount of 1–5000 mmol %, preferably 10–4000 mmol % and more preferably 50–3000 mmol % based on the total repeating units of monomer components of the liquid-crystalline polyester resin. In the case when 2-hydroxy-3-naphthoic acid and 2-hydroxynaphthalene-3,6-dicarboxylic acid are used in combination, their weight ratio may preferably be 10/90-90/10, more preferably 20/80-80/20.

2-hydroxy-3-naphthoic acid can be prepared by reacting 2-naphthol with sodium hydroxide to give sodium 2-naphtholate, reacting the sodium 2-naphtolate with carbon dioxide under an increased pressure, and separating the product by means of acid crystallization. The product may optionally be purified.

2-hydroxynaphthalene-3,6-dicarboxylic acid can be prepared by the method described in WO 98/17621 (Japanese Patent Application No. 519205/1998), i.e. reacting potassium 2-naphtholate with carbon dioxide, separating the product by means of acid crystallization, and optionally purifying thus obtained product.

The liquid-crystalline polyester resin of the present invention further comprises an alkaline metal compound in an amount of 10–3000 ppm, preferably 20–2000 ppm, more preferably 30–1000 ppm as an alkaline metal.

Examples of alkaline metals include lithium, sodium, potassium, cesium and rubidium. Among the above, sodium and potassium are preferable, and potassium is most preferable.

Alkaline metal compounds in LCP are in the forms of salts. Examples of such salts include sulfate, carbonate, bicarbonate, nitrate, carboxylate and haloid of alkaline metal. Among the above, carboxylate, sulfate and carbonate are preferable. As carboxylate, salts with aliphatic carboxylic acid having 2 to 6 carbon atoms and that introducing component of the liquid-crystalline polyester resin are preferable. Examples of such carboxylate include acetate, 4-hydroxybenzoate, 2-hydroxy-6-naphthoate, 2-hydroxy-3-naphthoate, 2-hydroxynaphthalene-3,6-dicarboxylate and salts of polymerizing monomers from which other aromatic carbonyl repeating units are derived and the like.

The mean volume diameter of alkaline metal salt in the polyester resin is preferably 0.01–500 μm, more preferably 0.05–150 μm.

The liquid-crystalline polyester resin of the present invention is not specifically limited and may be any polyester resin that exhibits an isotropic melt phase and is called as thermotropic liquid-crystalline polyester resin by those skilled in the art.

The anisotropic melt phase can be confirmed by means of conventional polarized light system using orthogonal light polarizer. In more detail, the sample on the hot stage under nitrogen atmosphere may be observed.

The liquid-crystalline polyester resin of the present invention may preferably be a liquid-crystalline polyester resin or a liquid-crystalline polyester amide resin which exhibits an isotropic melt phase and comprises structural monomer unit(s) selected from the group consisting of aromatic hydroxycarboxylic acid, aromatic dicarboxylic acid, aromatic diol, aromatic hydroxy dicarboxylic acid, aromatic hydroxyamine, aromatic diamine, aromatic aminocarboxylic acid. Among the above, aromatic diol, aromatic dicarboxylic acid, aromatic hydroxycarboxylic acid and aromatic hydroxydicarboxylic acid are preferable.

Examples of the aromatic hydroxycarboxylic acids include 4-hydroxybenzoic acid, 3-hydroxybenzoic acid, 2-hydroxybenzoic acid, 2-hydroxy-6-naphthoic acid, 2-hydroxy-5-naphthoic acid, 2-hydroxy-3-naphthoic acid, 4'-hydroxyphenyl-4-benzoic acid, 3'-hydroxyphenyl-4-benzoic acid, 4'-hydroxyphenyl-3-benzoic acid, and alkyl-, alkoxy- or halogen-substituted derivatives thereof as well as ester forming derivatives thereof. Among the above, 4-hydroxybenzoic acid and 2-hydroxy-6-naphthoic acid are preferable in terms of controlling the properties and the melting point of the resulting liquid-crystalline polyester resin.

Examples of the aromatic dicarboxylic acids include aromatic dicarboxylic acid such as terephthalic acid, isophthalic acid, 2,6-naphthalenedicarboxylic acid, 1,6-naphthalenedicarboxylic acid, 2,7-naphthalenedicarboxylic acid, 4,4'-dicarboxybiphenyl, bis (4-carboxyphenyl) ether, bis (4-carboxyphenoxy) butane, bis (4-carboxyphenyl) ethane, bis (3-carboxyphenyl) ether, bis (3- carboxyphenyl) ethane and alkyl-, alkoxy- or halogen-substituted derivatives thereof as well as ester forming derivatives thereof. Among the above, terephthalic acid and 2,6-naphthalenedicarboxylic acid are preferable in terms of controlling the mechanical properties, heat resistance, melting point and moldability of the resulting liquid-crystalline polyester resin to the desired level.

Examples of the aromatic diols include aromatic diol such as hydroquinone, resorcin, 2,6-dihydroxynaphthalene, 2,7-dihydroxynaphthalene, 1,6-dihydroxynaphthalene, 4,4'-dihydroxybiphenyl, 3,3'-dihydroxybiphenyl, 3,4'-dihydroxybiphenyl, 4,4'-dihydroxybiphenylether, bis (4-hydroxyphenyl) ethane and alkyl-, alkoxy- or halogen-substituted derivatives thereof as well as ester forming derivatives thereof. Among the above, hydroquinone and 4,4'-dihydroxybiphenyl are preferable in terms of the good reactivity during the polymerization process and the good properties of the resulting liquid-crystalline polyester resin.

Examples of the aromatic hydroxyamines, aromatic diamines and aromatic aminocarboxylic acids include aromatic hydroxyamine such as 4-aminophenol, N-methyl-4-aminophenol, 3-aminophenol, 3-methyl-4-aminophenol, 4-amino-1-naphthol, 4-amino-4'-hydroxydiphenyl, 4-amino-4'-hydroxydiphenylether, 4-amino-4'-hydroxybiphenylmethane, 4-amino-4'-hydroxybiphenylsulfide, aromatic diamine such as 1,4-phenylenediamine, N-methyl-1,4-phenylenediamine, N,N'-dimethyl-1,4-phenylenediamine, 4,4'-diaminophenylsulfide (thiodianiline), 2,5-diaminotoluene, 4,4'-ethylenedianiline, 4,4'-diaminodiphenoxyethane, 4,4'-diaminobiphenylmethane(methylenedianiline), 4,4'-diaminodiphenylether(oxydianiline), 4,4'-diaminodiphenylsulfone, aromatic aminocarboxylic acid such as 4-aminobenzoic acid, 6-amino-2-naphthoic acid, 7-amino-2-naphthoic acid and ester forming derivatives thereof.

Examples of the aromatic hydroxydicarboxylic acids include 2-hydroxynaphthalene-3,6-dicarboxylic acid, 4-hydroxyisophthalic acid, 5-hydroxyisophthalic acid and alkyl, alkoxy- or halogen-substituted derivatives thereof as well as ester forming derivatives thereof.

In addition, unless impair the object of the present invention, the liquid-crystalline polyester resin of the present invention may be copolymerized with other monomers than described above. Examples of such monomers include alicyclic dicarboxylic acid, aliphatic diol, alicyclic diol, aromatic mercaptocarboxylic acid, aromatic dithiol, aromatic mercaptophenol, aromatic mercaptonaphthol and the like. The proportion of these additional monomers to the total amount of aromatic hydroxycarboxylic acid, aromatic dicarboxylic acid and aromatic diol is preferably no more than 10 mol %.

Examples of alicyclic dicarboxylic acids, aliphatic diols and alicyclic diols include alicyclic dicarboxylic acid such as hexahydroterephthalic acid; alicyclic diol such as trans-1,4-cyclohexanediol, cis-1,4-cyclohexanediol, trans-1,4-cyclohexanedimethanol, cis-1,4-cyclohexanedimethanol, trans-1,3-cyclohexanediol, cis-1,2-cyclohexanediol, trans-1,3-cyclohexanedimethanol, linear or branched aliphatic diol such as ethylene glycol, 1,3-propanediol, 1,4-butanediol, neopentylglycol and ester forming derivatives thereof.

Examples of aromatic mercaptocarboxylic acids, aromatic dithiols, aromatic mercaptophenols and aromatic mercaptonaphthols include aromatic mercaptocarboxylic acid such as 4-mercaptobenzoic acid, 2-mercapto-6-naphthoic acid, 2-mercapto-7-naphthoic acid; aromatic dithiol such as benzene-1,4-dithiol, benzene-1,3-dithiol, 2,6-naphthalenedithiol, 2,7-naphthalenedithiol; aromatic mercaptophenol such as 4-mercaptophenol, 3-mercaptophenol; aromatic mercaptonaphthol such as 6-mercapto-2-naphthol, 7-mercapto-2-naphthol and ester forming derivatives thereof.

In the above description concerning the structural monomer components, the term "alkyl-substituted derivative" means a monomer substituted with a linear or branched alkyl group which has 1–6 carbon atoms and can be used for introducing an intended structural component into the resin. The term "alkoxy-substituted derivative" means a monomer substituted with an alkoxy group which can be used for introducing an intended structural component into the resin. The term "halogen-substituted derivative" mean a monomer substituted with halogen atom which can be used for introducing an intended structural component into the resin. The term "ester forming derivative" means a reactive monomer or oligomer which can be used for introducing an intended structural component into the resin by means of esterification reaction. Examples of suitable ester forming derivates include monomer of which the carboxyl group is converted to alkyl ester or acid halide.

The liquid-crystalline polyester resin comprising the above described monomer components may include both of those give anisotropic melt phases and those do not, depending on structural components of the polyester resin and the ratio thereof, and sequence distribution. The liquid-crystalline polyester resins used in the present invention are limited to those exhibit an isotropic melt phases.

Examples of the preferred liquid-crystalline polyester resins include those having following basic monomer component;

4-hydroxybenzoic acid/2-hydroxy-6-naphthoic acid copolymer;

2-hydroxy-6-naphthoic acid/terephthalic acid/4,4'- dihydroxybiphenyl copolymer;

2-hydroxy-6-naphthoic acid/terephthalic acid/isophthalic acid/4,4'-dihydroxybiphenyl copolymer;

2-hydroxy-6-naphthoic acid/terephthalic acid/isophthalic acid/4,4'-dihydroxybiphenyl/hydroquinone copolymer;

2-hydroxy-6-naphthoic acid/terephthalic acid/hydroquinone copolymer;

4-hydroxybenzoic acid/2-hydroxy-6-naphthoic acid/terephthalic acid/4,4'-dihydroxybiphenyl copolymer;

4-hydroxybenzoic acid/2-hydroxy-6-naphthoic acid terephthalic acid/hydroquinone copolymer;

2-hydroxy-6-naphthoic acid/2,6-naphthalenedicarboxylic acid/4,4'-dihydroxybiphenyl copolymer;

2-hydroxy-6-naphthoic acid/terephthalic acid/2,6-naphthalenedicarboxylic acid/hydroquinone copolymer;

2-hydroxy-6-naphthoic acid/2,6-naphthalenedicarboxylic acid/hydroquinone copolymer;

4-hydroxybenzoic acid/2-hydroxy-6-naphthoic acid/2,6-naphthalenedicarboxylic acid/hydroquinone copolymer;

2-hydroxy-6-naphthoic acid/terephthalic acid/2,6-naphthalenedicarboxylic acid/hydroquinone/4,4'-dihydroxybiphenyl copolymer;

2-hydroxy-6-naphthoic acid/terephthalic acid/4-aminophenol copolymer;

4-hydroxybenzoic acid/2-hydroxy-6-naphthoic acid/terephthalic acid/4-aminophenol copolymer;

2-hydroxy-6-naphthoic acid/terephthalic acid/4,4'-dihydroxybiphenyl/4-aminophenol copolymer;

2-hydroxy-6-naphthoic acid/terephthalic acid/ethylene glycol copolymer;

2-hydroxy-6-naphthoic acid/terephthalic acid/4,4'-dihydroxybiphenyl/ethylene glycol copolymer;

4-hydroxybenzoic acid/2-hydroxy-6-naphthoic acid/terephthalic acid/ethylene glycol copolymer;

4-hydroxybenzoic acid/2-hydroxy-6-naphthoic acid/terephthalic acid/4,4'-dihydroxybiphenyl/ethylene glycol copolymer.

Among the above, preferred liquid-crystalline polyesters of the present invention are those comprising, as structural components, the repeating units represented by the following formulae (I) and (II), the repeating units represented by the following formulae (II), (III) and (IV) or the repeating units represented by the following formulae (I), (II), (III) and (IV)

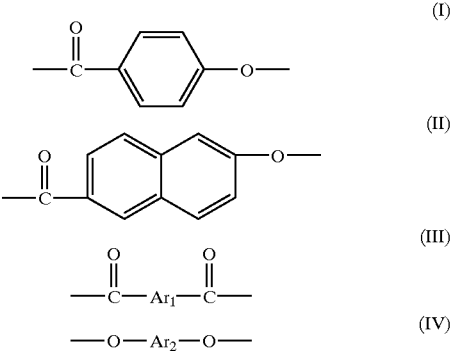

wherein $Ar_1$ and $Ar_2$ represent benzene ring, naphthalene ring, biphenyl ring, biphenylether ring or biphenyl alkane ring, wherein alkane has 1 to 4 carbon atoms, and the rings may be substituted with alkyl group, alkoxy group or halogen atom.

Examples of the above substituents such as alkyl group and alkoxyl group include linear or branched group having 1 to 6 carbon atoms. Examples of halogen atoms include fluorine, chlorine, bromine and iodine.

When the repeating units represented by formulae (I) and (II) are used, the molar ratio of (I)/(II) may preferably be 10/90-90/10, more preferably 20/80-80/20. When the repeating units represented by formulae (II), (III) and (IV) are used, the molar ratio of (II)/(III)+(IV) may preferably be 90/10-10/90, more preferably 85/15-60/40. When the repeating units represented by formulae (I), (II), (III) and (IV) are used, the molar ratio of (I)/(II) may preferably be as described above and the molar ratio of (I)+(II)/(III)+(IV) may preferably be 90/10-50/50, more preferably 85/15-60/40.

Examples of monomers used for introducing the repeating unit of formula (I) include 4-hydroxybenzoic acid. Examples of monomers used for introducing the repeating unit of formula (II) include 2-hydroxy-6-naphthoic acid. Examples of monomers used for introducing the repeating unit of formula (III) includes terephthalic acid and 2,6-naphthalenedicarboxylic acid. Examples of monomers used for introducing the repeating unit of formula (IV) include hydroquinone and 4,4'-dihydroxybiphenyl.

The liquid-crystalline polyester resin of the present invention can be prepared by adding an alkaline metal compound, and 2-hydroxy-3-naphthoic acid and/or 2-hydroxynaphthalene-3,6-dicarboxylic acid to the structural monomer units of the liquid-crystalline polyester resin before or during the polymerizing reaction.

Alternatively, alkaline metal compound, and 2-hydroxy-3-naphthoic acid and/or 2-hydroxynaphthalene-3,6-dicarboxylic acid may be contained in any of the monomers used for preparing the liquid-crystalline polyester resin. The liquid-crystalline polyester resin of the present invention can be prepared by copolymerizing the monomer containing the alkaline metal compound, and 2-hydroxy-3-naphthoic acid and/or 2-hydroxynaphthalene-3,6-dicarboxylic acid and the other polymerizing monomers.

When alkaline metal compound, and 2-hydroxy-3-naphthoic acid and/or 2-hydroxynaphthalene-3,6-dicarboxylic acid are contained in a monomer component, the preferable monomer is 2-hydroxy-6-naphthoic acid. In particular, 2-hydroxy-6-naphthoic acid preferably includes alkaline metal compound in an amount of 50–5000 ppm as alkaline metal and 2-hydroxy-3-naphthoic acid and/or 2-hydroxynaphthalene-3,6-dicarboxylic acid in an amount of 50–10000 ppm.

The method for preparing the liquid-crystalline polyester resin of the present invention is not limited and any known method can be employed. For example, conventional polymerization method such as molten acidolysis method and slurry polymerization method for preparing a polyester to give ester bondings among the above described monomer components may be employed.

The molten acidolysis method is preferably used for the present invention. In this method, the polymerizing monomers are heated to give molten solution of the reactants and then the solution is reacted to give the molten polymer. The final step of this method may be carried out under vacuum to facilitate removal of the volatile by-products such as acetic acid or water.

The slurry polymerization method is characterized in that monomers are reacted in a heatexchange fluid to give solid state polymer in the form of suspension in the heatexchange liquid medium.

In either of the molten acidolysis method or the slurry polymerization method, the polymerizing monomer components used for the preparation of the liquid-crystalline polyester resin may be in the denatured form, i.e. in the form of lower acyl esters, that obtained by esterifying the hydroxyl group at room temperature. The lower acyl group may have preferably 2–5, more preferably 2–3 carbon atoms. Acetic esters are most preferably used for the reaction.

The lower acyl esters of the monomers may be those prepared beforehand by acylating the monomers independently or may be those produced in the reaction system by adding an acylating agent such as acetic anhydride to the monomers upon preparing the liquid-crystalline polyester.

In either of the molten acidolysis method or the slurry polymerization method, a catalyst may be used in the reaction, if desired.

Examples of the catalysts include organic tin compounds such as dialkyl tin oxide (ex. dibutyl tin oxide) and diaryl tin oxide; organic titanium compounds such as titanium dioxide, alkoxy titanium silicate and titanium alkoxide; antimony trioxide; alkaline or alkaline earth metal salt of carboxylic acid such as potassium acetate; and gaseous acid catalysts such as Lewis acid (ex. $BF_3$) and halogenated hydrogen (ex. HCl).

When a catalyst is used, the amount of the catalyst added to the reaction based on the total monomers may preferably be 10–1000 ppm, and more preferably 20–200 ppm.

Preferably, the liquid-crystalline polyester resin of the present invention is that log viscosity of the same can be measured in pentafluorophenol. The log viscosity of the polymer measured at a concentration of 0.1 g/dl in pentafluorophenol at 60° C. may preferably be 0.3 dl/g or above, more preferably 0.5–10 dl/g, most preferably 1–8 dl/g.

The melting viscosity of the liquid-crystalline polyester resin of the present invention measured with capillary rheometer at a temperature 30° C. higher than the melting point of the resin may preferably be 1–1,000 Pa.s, more preferably 5–300 Pa.s.

The present invention further provides a liquid-crystalline polyester resin composition comprising the above-described liquid-crystalline polyester resin. The liquid-crystalline polyester resin composition may be those obtained by admixing one or more filler and/or reinforcing agent to the liquid-crystalline polyester resin. The form of the filler and/or reinforcing agent may be any of conventional reinforcing agents and/or fillers for resin compositions such as fibrous, plate or particulate form.

Examples of fibrous fillers and reinforcing agents may include glass fiber, silica-alumina fiber, alumina fiber, carbon fiber and aramid fiber. Among them, glass fiber is preferably used because of its good balance of physical properties and cost.

Examples of plate or particulate fillers may include talc, mica, graphite, wollastonite, calcium carbonate, dolomite, clay, glass flake, glass beads, barium sulfate and titanium oxide.

The fillers and/or reinforcing agents may be added to the liquid-crystalline polyester resin composition in an amount of 0–100 parts by weight, especially 20–70 parts by weight to 100 parts by weight of the liquid-crystalline polyester resin. If the amount of the fibrous, plate and/or particulate inorganic filler is more than 100 parts by weight, the moldability of the resulting liquid-crystalline polyester resin composition tends to be decreased or the exhausting of the cylinder or die of the molding device tends to be increased.

The liquid-crystalline polyester resin composition according to the present invention may further be admixed with one or more additives conventionally used for resin compositions, if desired, for example molding lubricant such as higher aliphatic acid, higher aliphatic ester, higher aliphatic amide, higher aliphatic acid metal salt, polysiloxane and fluorocarbon resin; colorant such as dyes and pigments; antioxidant; thermal stabilizer; UV absorbent; antistatic agent and surface active agent.

Additionally, an agent which provides an exterior lubricant effect such as higher aliphatic acid, higher aliphatic ester, higher aliphatic acid metal salt or fluorocarbon-type surfactant may be added to the pellets of the liquid-crystalline polyester resin or the liquid-crystalline polyester resin composition according to the present invention, so that the agent adhere to the surface of the pellet, before subjecting the pellets to the injection-molding process.

To the liquid-crystalline polyester resin composition of the present invention, one or more resin components other than those described as above may be added. Examples of other resin components include thermoplastic resins such as polyamide, polyester, polyphenylene sulfide, polyether ketone, polycarbonate, polyphenylene ether and denatured derivatives thereof, polysulfone, polyethersulfone and polyether imide and thermosetting resins such as phenol resin, epoxy resin and polyimide resin.

The liquid-crystalline polyester resin composition of the present invention may be obtained by adding fillers, reinforcing agents and other resin components to the polyester resin and melt kneading the mixture at a temperature from near the melting point of the polymer to the melting point plus 100° C. using a kneading machine such as Banbury mixer, kneader, single screw extruder, twin screw extruder or the like.

The liquid-crystalline polyester resin or the liquid-crystalline polyester resin composition according to the present invention may be molded using a conventional melt molding process, preferably injection molding, compression molding, extrusion molding and blow molding. The molded article, film and fiber obtained with the liquid-crystalline polyester resin of the present invention are particular useful for parts of electric and electronic devices, machines and automobiles.

EXAMPLES

The present invention is further described in reference to the following Examples. The following examples are intended to illustrate the invention and are not to be construed to limit the scope of the invention.

In the examples, following abbreviations are used.

LCP: liquid-crystalline polyester

BON3: 2-hydroxy-3-naphthoic acid

BON3,6: 2-hydroxynaphthalene-3,6-dicarboxylic acid

Monomers Used

POB: 4-hydroxybenzoic acid, which may contain less than 1 ppm (detected by atomic absorption spectrometry) of alkaline metal.

BON6: 2-hydroxy-6-naphthoic acid, which may contain below the detection limit (by means of high-performance liquid chromatography) of BON3 and BON3,6 and which may contain less than 1 ppm (detected by atomic absorption spectrometry) of alkaline metal.

TPA: terephthalic acid, which may contain less than 1 ppm (detected by atomic absorption spectrometry) of alkaline metal.

HQ: hydroquinone, which may contain less than 1 ppm (detected by atomic absorption spectrometry) of alkaline metal.

NDA: 2,6-naphthalenedicarboxylic acid, which may contain less than 1 ppm (detected by atomic absorption spectrometry) of alkaline metal.

Polymerizing Condition

<polymerizing condition-1>

The polymerizing condition of LCP-1 comprising 4-hydroxybenzoic acid and 2-hydroxy-6-naphthoic acid in the ratio of 70/30 (mol %) is described below.

POB and BON6 in the ratio of LCP-1 shown as above were fed in a reaction container equipped with an agitating device with torque-meter and condenser so that the total monomer amount was 7.5 mol. Then acetic anhydride of 1.025 fold moles to the total monomers was added to the container. Under the nitrogen atmosphere, the mixture was heated to 150° C. and kept at the temperature for 30 minutes, then rapidly heated to 190° C. with distilling out the by-product acetic acid and kept at the temperature for 1 hour.

Then the mixture was heated to 320° C. over 3.5 hours and the pressure was reduced to 20 mmHg over about 30 minutes. When the torque became the predetermined level, the polymerizing reaction was terminated. The resulting resin was removed from the container by a taking off means and crushed to give pellets. As a result, approximately theoretical amount of acetic acid was distilled out.

<Polymerizing condition-2>

The polymerizing condition of LCP-2 comprising 4-hydroxybenzoic acid, 2-hydroxy-6-naphthoic acid, terephthalic acid and hydroquinone in the ratio of 60/18/11/11 (mol %) is described below.

POB, BON6, TPA and HQ in the ratio of LCP-2 shown as above were fed in a reaction container. The polymerizing condition was the same as condition-1 except for that the mixture was kept at 190° C. for 1 hour and heated to 360° C. over 3.75 hours.

<Polymerizing condition-3>

The polymerizing condition of LCP-3 comprising 4-hydroxybenzoic acid, 2-hydroxy-6-naphthoic acid, naphthalenedicarboxylic acid and hydroquinone in the ratio of 65/5/15/15 (mol %) is described below.

POB, BON6, NDA and HQ in the ratio of LCP-3 shown as above were fed in a reaction container. The polymerizing condition was the same as condition-1 except for that the mixture was kept at 190° C. for 1 hour and heated to 360° C. over 3.75 hours.

Coloring of LCP and Method for Preparing Test Pieces

The liquid-crystalline polyester resin obtained by polymerizing reaction was molten kneaded with carbon black. (Mitsubishi carbon black #45, Mitsubishi Chemical Corporation) to give colored liquid-crystalline polyester resin. In this coloring process, twin screw extruder PCM-30 (Ikegai Corporation) was used. The amount of carbon black used was 1 part by weight to 100 parts by weight of the resin pellet. Then the mixture was pelletized with strand-cutter.

Thus obtained black colored pellets were molded with injection molder MINIMAT 26/15 (Sumitomo Heavy Industries, Ltd.) (Cylinder temperature:350–350–310–280° C., die temperature: 70° C.) to give strip shaped bending test pieces of 12.7×64×3.0 (mm).

The Method for Evaluating the Brightness of Color

The strip shaped bending test piece was set in the window frame (10×7.5 (mmφ) of spectrophotometer (MACBETH COLOR-EYE 7000, Sakata Inx Corporation) and the L*, a* and b* values were measured. The value L* shows the brightness of color and the lower L* value means the test piece is well colored in black. Accordingly, this value was used for evaluating the colorability of the resin.

The Method for Determining Izod Impact Value

Izod impact value was measured using strip shaped bending test pieces based on ASTM D256.

Example 1

The monomer components of LCP-1, BON3 and potassium sulfate were fed in a reaction container so that, at the beginning of the polymerization, the content of BON3 residue in the resin was 500 mmol % and the content of potassium sulfate calculated as the amount of potassium in the resin was 200 ppm. The polymerization and acetic acid distillization reaction was conducted by the method according to polymerizing condition-1. The colorability and Izod impact value of the resulting liquid-crystalline polyester resin were measured. The potassium content of the pellet obtained after polymerization measured by atomic absorption spectrometry was 206 ppm.

Example 2

Polymerization and evaluation were conducted according to the method of Example 1 except for that BON3,6 was added instead of BON3 so that the content of BON3,6 residue in the resin was 700 mmol % at the beginning of the polymerization. The potassium content of the liquid-crystalline polyester resin pellet obtained after polymerization measured by atomic absorption spectrometry was 203 ppm.

Example 3

Polymerization and evaluation were conducted according to the method of Example 1 except for that BON3,6 was added in addition to BON3 so that the contents of BON3 and BON3,6 residues in the resin were 500 mmol % and 700 mmol % respectively at the beginning of the polymerization. The potassium content of the liquid-crystalline polyester resin pellet obtained after polymerization measured by atomic absorption spectrometry was 201 ppm.

Example 4

The monomer components of LCP-2, BON3, BON3,6 and potassium sulfate were fed in a reaction container so that, at the beginning of the polymerization, the contents of BON3 and BON3,6 residues in the resin were 800 mmol % and 1000 mmol % respectively and the content of potassium sulfate calculated as the amount of potassium in the resin was 400 ppm. The polymerization and acetic acid distillization reaction was conducted by the method according to polymerizing condition-2. The colorability and Izod impact value of the resulting liquid-crystalline polyester resin were measured according to the method of Example 1. The potassium content of the pellet obtained after polymerization measured by atomic absorption spectrometry was 399 ppm.

Example 5

The monomer components of LCP-3, BON3, BON3,6 and potassium sulfate were fed in a reaction container so that, at the beginning of the polymerization, the contents of BON3 and BON3,6 residues in the resin were 500 mmol % and 600 mmol % respectively and the content of potassium sulfate calculated as the amount of potassium in the resin was 250 ppm. The polymerization and acetic acid distillization reaction was conducted by the method according to polymerizing condition-3. The colorability and Izod impact value of the resulting liquid-crystalline polyester resin were measured according to the method of Example 1. The potassium content of the pellet obtained after polymerization measured by atomic absorption spectrometry was 249 ppm.

Comparative Example-1

The monomer components of LCP-1 and potassium sulfate were fed in a reaction container so that, at the beginning of the polymerization, the content of potassium sulfate calculated as the amount of potassium in the resin was 300 ppm. The polymerization and acetic acid distillization reaction was conducted by the method according to polymerizing condition-1. The colorability and Izod impact value of the resulting liquid-crystalline polyester resin were measured according to the method of Example 1. The potassium content of the pellet obtained after polymerization measured by atomic absorption spectrometry was 303 ppm.

Comparative Example-2

The monomer components of LCP-1, BON3 and BON3,6 were fed in a reaction container so that, at the beginning of polymerization, the contents of BON3 and BON3,6 residues in the resin were 300 mmol % and 400 mmol % respectively.

The polymerization and acetic acid distillization reaction was conducted by the method according to polymerizing condition-1. The colorability and Izod impact value of the resulting liquid-crystalline polyester resin were measured according to the method of Example 1. The potassium content of the pellet obtained after polymerization measured by atomic absorption spectrometry was 2 ppm.

Comparative Example-3

The monomer components of LCP-1, BON3,6 and potassium sulfate were fed in reaction container so that, at the beginning of the polymerization, the content of BON3,6 residue in the resin was 7000 mmol % and the content of potassium sulfate calculated as the amount of potassium in the resin was 200 ppm. The polymerization and acetic acid distillization reaction was conducted by the method according to polymerizing condition-1. The colorability and Izod impact value of the resulting liquid-crystalline polyester resin were measured according to the method of Example 1. The potassium content of the pellet obtained after polymerization measured by atomic absorption spectrometry was 200 ppm.

sured according to the method of Example 1. The potassium content of the pellet obtained after polymerization measured by atomic absorption spectrometry was 5005 ppm.

Comparative Example-6

The monomer-components of LCP-3 and BON3 were fed in a reaction container so that, at the beginning of the polymerization, the content of BON3 residue in the resin was 400 mmol %. The polymerization and acetic acid distillization reaction was conducted by the method according to polymerizing condition-3. The colorability and Izod impact value of the resulting liquid-crystalline polyester resin were measured according to the method of Example 1. The potassium content of the pellet obtained after polymerization measured by atomic absorption spectrometry was 1 ppm.

These results are shown in the following table 1.

TABLE 1

|  | Example | | | | | Comparative example | | | | | |
| --- | --- | --- | --- | --- | --- | --- | --- | --- | --- | --- | --- |
|  | 1 | 2 | 3 | 4 | 5 | 1 | 2 | 3 | 4 | 5 | 6 |
| composition | | | | | | | | | | | |
| Basic composition | LCP-1 | LCP-1 | LCP-1 | LCP-2 | LCP-3 | LCP-1 | LCP-1 | LCP-1 | LCP-1 | LCP-2 | LCP-3 |
| BON3,6 content✕ (mmol %) | — | 700 | 700 | 1000 | 600 | — | 400 | 7000 | — | — | — |
| BON3 content✕ (mmol %) | 500 | — | 500 | 800 | 500 | — | 300 | — | 8000 | — | 400 |
| Potassium content (PPM) | 206 | 203 | 201 | 399 | 249 | 303 | 2 | 200 | 199 | 5005 | 1 |
| property | | | | | | | | | | | |
| L* | 33 | 32 | 34 | 32 | 33 | 38 | 39 | 39 | 37 | 39 | 40 |
| IZOD impact value (J/M) | 426 | 432 | 414 | 412 | 388 | 291 | 207 | 53 | 78 | 255 | 188 |

(note)
✕The content is the concentration in the resin calculated from the amount of each component fed to the reaction container Comparative Example-4

The monomer components of LCP-1, BON3 and potassium sulfate were fed in a reaction container so that, at the beginning of the polymerization, the content of BON3 residue in the resin was 8000 mmol % and the content of potassium sulfate calculated as the amount of potassium in the resin was 200 ppm. The polymerization and acetic acid distillization reaction was conducted by the method according to polymerizing condition-1. The colorability and Izod impact value of the resulting liquid-crystalline polyester resin were measured according to the method of Example 1. The potassium content of the pellet obtained after polymerization measured by atomic absorption spectrometry was 199 ppm.

Comparative Example-5

The monomer components of LCP-2 and potassium sulfate were fed in a reaction container so that, at the beginning of the polymerization, the content of potassium sulfate calculated as the amount of potassium in the resin was 5000 ppm. The polymerization and acetic acid distillization reaction was conducted by the method according to polymerizing condition-2. The colorability and Izod impact value of the resulting liquid-crystalline polyester resin were mea-

INDUSTRIAL APPLICABILITY

The liquid-crystalline polyester resin of the present invention has good colorability, improved heat resistance and good mechanical properties. The liquid-crystalline polyester resin and the composition comprising the polyester resin of the present invention may be molded using a conventional molding process, preferably injection molding, compression molding, extrusion molding and blow molding. The molded article obtained with the liquid-lyester crystalline polyester resin of the present invention such as injection molded article, film and fiber is particular useful for parts of electric and electronic devices, machines and automobiles.

What is claimed is:

1. A liquid-crystalline polyester resin which comprises monomer units derived from 2-hydroxy-3-naphthoic acid and/or 2-hydroxynaphthalene-3,6-dicarboxylic acid in an amount of 1–5000 mmol % based on the total monomer components of the resin and an alkaline metal compound in an amount of 10–3000 ppm as alkaline metal based on the total monomer components of the resin.

2. The liquid-crystalline polyester resin according to claim 1, wherein said alkaline metal is potassium and/or sodium.

3. The liquid-crystalline polyester resin according to claim 1, wherein said alkaline metal compound is one or more salt(s) selected from the group consisting of sulfate, carbonate, bicarbonate, nitrate, carboxylate and haloid of alkaline metal.

4. The liquid-crystalline polyester resin according to claim 3, wherein the mean volume diameter of the alkaline metal salt in the resin is 0.01–500 μm.

5. The liquid-crystalline polyester resin according to claim 1, wherein the resin comprises the repeating units represented by the following formulae (I) and (II), the repeating units represented by the following formulae (II), (III) and (IV) or the repeating units represented by the following formulae (I), (II), (III) and (IV)

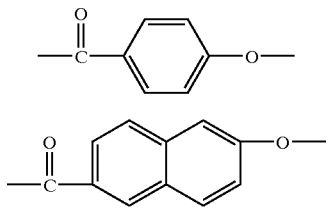

(I)

(II)

(III)

(IV)

wherein $Ar_1$ and $Ar_2$ represent benzene ring, naphthalene ring, biphenyl ring, biphenylether ring or biphenyl alkane ring, wherein alkane has 1 to 4 carbon atoms, and the rings may be substituted with alkyl group, alkoxy group or halogen atom.

* * * * *